United States Patent
Fay, II et al.

(10) Patent No.: US 12,029,154 B2
(45) Date of Patent: Jul. 9, 2024

(54) MOWER-CONDITIONER MACHINE FOR SENSING MOISTURE CONTENT OF CROP MATERIAL

(71) Applicant: CNH Industrial America LLC, New Holland, PA (US)

(72) Inventors: Jeffrey B. Fay, II, Oxford, PA (US); Philip Eby, Leola, PA (US); Benjamin A. Heiser, Gap, PA (US); Michael Jacob Digman, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 762 days.

(21) Appl. No.: 17/141,651

(22) Filed: Jan. 5, 2021

(65) Prior Publication Data

US 2022/0210974 A1 Jul. 7, 2022

(51) Int. Cl.
*A01D 34/00* (2006.01)
*A01D 43/00* (2006.01)

(52) U.S. Cl.
CPC ......... *A01D 34/006* (2013.01); *A01D 34/008* (2013.01); *A01D 43/003* (2013.01)

(58) Field of Classification Search
CPC .................................................. A01D 34/006
See application file for complete search history.

(56) References Cited

U.S. PATENT DOCUMENTS

| 6,185,990 | B1 * | 2/2001 | Missotten | ............ | A01B 79/005 56/10.2 A |
| 6,584,390 | B2 | 6/2003 | Beck | | |
| 6,668,223 | B2 * | 12/2003 | Blackmore | .......... | A01D 41/127 701/50 |
| 6,686,749 | B2 | 2/2004 | Rains et al. | | |
| 7,503,160 | B2 * | 3/2009 | Degen | ................... | A01D 43/085 460/1 |
| 9,578,808 | B2 * | 2/2017 | Dybro | .................... | A01D 75/00 |
| 10,188,025 | B2 * | 1/2019 | Kirk | ....................... | G01G 17/02 |
| 2004/0002368 | A1 | 1/2004 | Shinners et al. | | |
| 2012/0245802 | A1 * | 9/2012 | Schlesser | .......... | A01D 41/1243 460/59 |

(Continued)

FOREIGN PATENT DOCUMENTS

| BR | 102021017151 A2 * | 4/2022 | .......... A01D 41/127 |
| CA | 3049623 A1 * | 10/2018 | .......... A01D 34/667 |

(Continued)

OTHER PUBLICATIONS

Extended European Search Report for EP Application No. 22150367.5 dated May 23, 2022 (seven pages).

*Primary Examiner* — Alicia Torres
*Assistant Examiner* — Ashley A Kaercher
(74) *Attorney, Agent, or Firm* — Peter K. Zacharias; Rebecca L. Henkel; Rickard K. DeMille

(57) ABSTRACT

A mower-conditioner machine which includes a frame, a cutter bar connected to the frame, the cutter bar is configured to cut a crop material from a field, and a crop-engaging member connected to the frame. The crop-engaging member is configured to contact the crop material. The mower-conditioner machine also includes at least one moisture sensor connected to the crop-engaging member. The at least one moisture sensor is configured to sense a moisture content of the crop material.

20 Claims, 5 Drawing Sheets

(56) References Cited

U.S. PATENT DOCUMENTS

| | | | | |
|---|---|---|---|---|
| 2013/0152534 A1* | 6/2013 | Clark | ................... | A01D 41/127 |
| | | | | 56/10.2 B |
| 2014/0236381 A1* | 8/2014 | Anderson | ............ | A01B 79/005 |
| | | | | 701/1 |
| 2016/0088798 A1* | 3/2016 | Lang | ....................... | B30B 9/301 |
| | | | | 56/341 |
| 2016/0345491 A1* | 12/2016 | Missotten | ............... | B60K 35/00 |
| 2019/0110394 A1* | 4/2019 | VanNahmen | ........ | A01D 34/006 |
| 2019/0116733 A1 | 4/2019 | Wire et al. | | |
| 2019/0289787 A1* | 9/2019 | Heitmann | .......... | A01D 41/1271 |
| 2019/0327891 A1* | 10/2019 | Inoue | ..................... | A01F 12/60 |
| 2022/0210974 A1* | 7/2022 | Fay, II | ................. | A01D 34/008 |
| 2022/0210975 A1* | 7/2022 | Digman | .................. | A01F 15/00 |

FOREIGN PATENT DOCUMENTS

| | | | | |
|---|---|---|---|---|
| CA | 3049710 A1 * | 10/2018 | ........... | A01D 43/085 |
| EP | 2436259 A1 * | 4/2012 | ........... | A01D 43/102 |
| EP | 2436259 A1 | 4/2012 | | |
| EP | 4023046 A1 * | 7/2022 | | |
| EP | 4159023 A1 * | 4/2023 | ......... | A01D 41/1275 |
| KR | 10-0552630 B1 | 2/2006 | | |
| WO | WO-0100005 A2 * | 1/2001 | ......... | A01D 41/1271 |
| WO | 2010003421 A1 | 1/2010 | | |
| WO | WO-2010003421 A1 * | 1/2010 | ........... | A01B 79/005 |
| WO | WO-2014112154 A1 * | 7/2014 | ............. | A01B 76/00 |
| WO | WO-2021214580 A1 * | 10/2021 | ............. | A01D 57/26 |

\* cited by examiner

MOWER-CONDITIONER MACHINE FOR SENSING MOISTURE CONTENT OF CROP MATERIAL

BACKGROUND OF THE INVENTION

The present invention pertains to agricultural harvesting machines and, more specifically, to a mower-conditioner machine.

Agricultural harvesting machines may include self-propelled windrowers or pull-type mower-conditioners. Farmers may operate such mowing devices to cut crop material, for example hay or grass, from a field and subsequently deposit the cut crop into windrows on the field. The windrows may be left on the field to dry out the crop in the sun. Thereafter, farmers may bale the cut crop material with a baler, such as a large square baler or round baler, which straddles the windrows and travels along the windrows to pick up the crop material and form it into bales.

A typical pull-type mower-conditioner includes a frame, a hitch coupled to the towing vehicle, a cutter bar, a conditioner assembly, and a swathgate. The mower-conditioner may further include other elements such as a reel to assist crop feeding and an auger or belts to convey crop to a central discharge point. The cutter bar may be comprised of a series of rotary discs. The conditioner assembly may include two or more conditioning rolls for conditioning the crop material. The conditioning rolls are located adjacent to one another such that a gap forms therebetween. This gap in between the paired conditioning rolls helps to define the size of the crop mat which passes therethrough. After being conditioned, the stream of crop material engages with the swathgate and is deposited onto the field.

What is needed in the art is a cost-effective mower-conditioner machine which automatically monitors the moisture content of crop material.

SUMMARY OF THE INVENTION

Exemplary embodiments provided according to the present disclosure include a mower-conditioner machine. The mower-conditioner machine includes a frame, a cutter bar connected to the frame, the cutter bar is configured to cut a crop material from a field, and a crop-engaging member connected to the frame. The crop-engaging member is configured to contact the crop material. The mower-conditioner machine also includes at least one moisture sensor connected to the crop-engaging member. The at least one moisture sensor is configured to sense a moisture content of the crop material.

In some exemplary embodiments provided in accordance with the present disclosure there is provided a mower-conditioner machine. The mower-conditioner machine includes a frame, a cutter bar connected to the frame, the cutter bar is configured to cut a crop material from a field, and a crop-engaging member connected to the frame. The crop-engaging member is configured to contact the crop material. The mower-conditioner machine also includes at least one moisture sensor connected to the crop-engaging member. The at least one moisture sensor is configured to sense a moisture content of the crop material.

In some exemplary embodiments provided in accordance with the present disclosure, an agricultural assembly. The agricultural assembly includes a work vehicle and a mower-conditioner machine. The mower-conditioner machine includes a frame connected to work vehicle, a cutter bar connected to the frame, the cutter bar is configured to cut a crop material from a field, and a crop-engaging member connected to the frame. The crop-engaging member being configured to contact the crop material. The mower-conditioner also includes at least one moisture sensor connected to the crop-engaging member. The at least one moisture sensor is configured to sense a moisture content of the crop material.

In some exemplary embodiments provided in accordance with the present disclosure, a method for conducting an agricultural procedure. The method includes mowing a crop material in a field by a mower-conditioner machine, sensing, by at least one moisture sensor, a moisture content of the crop material, sensing, by a location sensor, a location of the mower-conditioner machine, generating, by a controller, a moisture content map based at least partially on the moisture content of the crop material and the location of the mower-conditioner machine, and estimating, by the controller, a drying time of the crop material based at least partially on the moisture content map.

One possible advantage that may be realized by exemplary embodiments provided according to the present disclosure is that the need to visit the field to check windrow moisture between mowing and a secondary operation can be reduced or eliminated.

Another possible advantage that may be realized by exemplary embodiments provided according to the present disclosure is that the controller may automatically generate a moisture content field map and automatically determine an estimated drying time for the cut crop material in the field.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural assembly and/or components thereof are usually determined with reference to the direction of forward operative travel, but they should not be construed as limiting. The terms "longitudinal" and "transverse" are determined with reference to the fore-and-aft direction of the work vehicle and are equally not to be construed as limiting. As used herein, the term mower-conditioner machine may include a pull-type mower-conditioner or a self-propelled mower-conditioner, including a rotary disc attachment head for a work vehicle.

Figure 1:
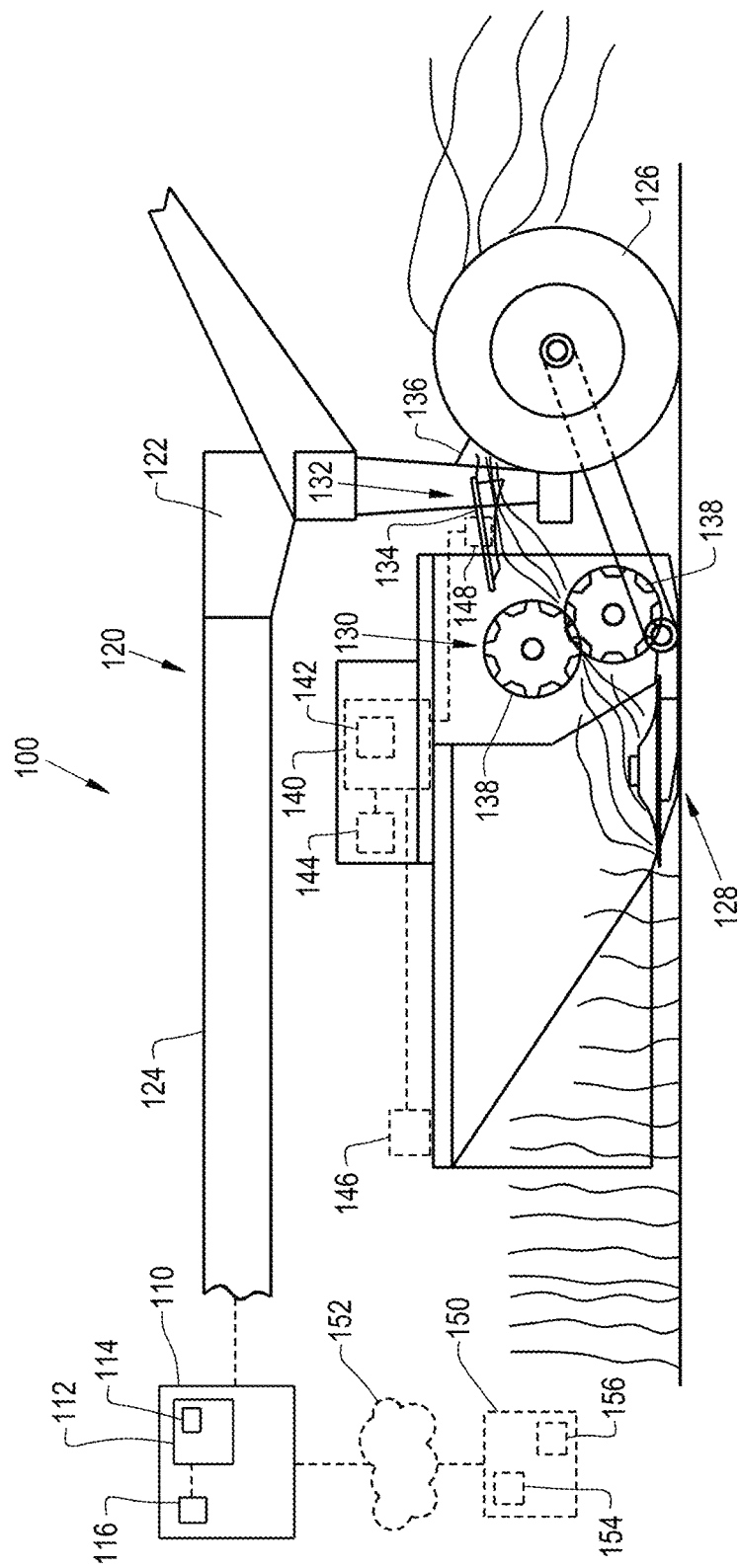
FIG. 1 illustrates a side view of an exemplary embodiment of an agricultural assembly, the assembly including a work vehicle and a pull-type mower-conditioner machine, in accordance with the present disclosure.
Figure 2:
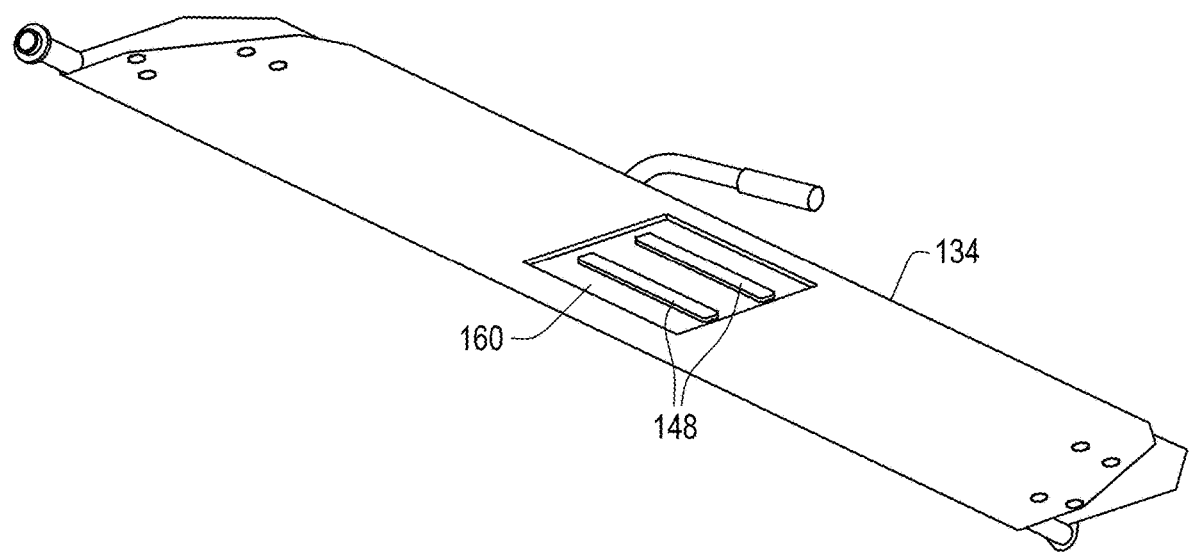
FIG. 2 illustrates a perspective view of a swathgate of the mower-conditioner machine of FIG. 1, the swathgate has a moisture sensor attached thereto.

Referring now to the drawings, and more particularly to FIGS. 1-2, there is shown an exemplary embodiment of an agricultural assembly 100 which includes a work vehicle 110 and a pull-type mower-conditioner machine 120. The work vehicle 110 may pull the mower-conditioner machine 120 in a forward direction of travel for mowing and conditioning the crop material in the field.

The work vehicle 110, which is shown schematically, may be in the form of any desired vehicle, such as a tractor or self-propelled windrower. The work vehicle 110 may include a chassis, wheels and/or tracks, a prime mover, a steering assembly, and a cab for housing an operator. The work vehicle 110 may also include a controller 112, with a memory 114, and one or more sensor(s) 116 for sensing various operating parameters of the work vehicle 110. For example, the work vehicle 110 may include a positioning or location sensor 116 for sensing and providing location data. The location sensor 116 may be in the form of a global positioning system (GPS) sensor or the like which tracks the position of the work vehicle 110 in the field. The work vehicle 110 may also include a speed sensor, inclinometer, etc.

The mower-conditioner machine 120 may be connected to and towed by the work vehicle 110. The mower-conditioner machine 120 may generally include a frame 122 with a tongue 124 connected to the vehicle 110, wheels 126, a transversely disposed cutter bar 128, a crop conditioner 130, and a discharge assembly 132. The discharge assembly 132 includes a swathgate 134 pivotally connected to the frame 122 and a pair of side shields 136 pivotally connected to the frame 122.

The mower-conditioner machine 120 may also include a controller 140, with a memory 142, and one or more sensor(s) 144, 146, 148 for sensing various operating parameters of the mower-conditioner machine 120 and/or characteristics of the crop material. For instance, the mower-conditioner machine 120 may include one or more location sensors 144, crop characteristic sensors 146, and moisture sensors 148. It should be appreciated that the mower-conditioner machine 120 may not include a separate controller 140; therein, the various sensors sensor(s) 144, 146, 148 may be operably coupled to the vehicle controller 112 which may control the functionality of the mower-conditioner machine 120.

As the mower-conditioner 120 is towed through the field, the standing crop is cut by the cutter bar 128 and transported downstream to the crop conditioner 130. The cutter bar 128 may be located at the front of the frame 122. The cutter bar 128 may be in the form of any desired cutter bar 128, such as a rotary disc cutter bar with multiple cutting disc heads. The crop conditioner 130 may condition or otherwise crush the crop material to decrease the drying time of the crop material on the field. The crop conditioner 130 generally includes at least two conditioning rolls 138 rotatably connected to the frame 122 and spaced apart from one another by a gap which allows the crop material to pass therethrough. The severed and conditioned crop material is then ejected rearwardly toward the discharge assembly 132.

The swathgate 134 generally influences the height or upper bound of the stream of crop material. The swathgate 134 may be automatically and/or manually adjusted relative to the frame. The side shields 136, which may also be adjustable relative to the frame 122, generally influence the width of the stream of crop material. If the mower-conditioner machine 120 is configured to create swaths, the ejected stream of crop material may contact and be directed by the swathgate 134. If the mower-conditioner machine 120 is configured to create windrows, the ejected stream of crop material may contact and be directed by the swathgate 134 and the shields 136. Relative to other harvesting procedures, mowing procedures may work the field in smaller sections or widths in a given pass through the field. Mower crop cutting widths are generally on the order of 3 to 4.5 meters, or 10 to 15 feet.

The controller 140 can be operably connected to the vehicle controller 112 via an ISOBUS communication interface. The controller 140 can be configured to receive location data from one or more location sensors 116 and/or 144, receive moisture content data from one or more moisture sensors 148, and receive crop information from user inputted data and/or from one or more crop characteristic sensors 146 which may sense crop characteristics, including the type of crop in the field. The controller 140 can also be configured to generate a moisture content map 154 based at least partially on the sensed moisture content data and the location data. The controller 140 can also be configured to estimate a drying time 156 of the crop material based at least partially on the moisture content map 154. However, if the mower-conditioner machine 120 is not equipped with the controller 140, the vehicle controller 112 may perform the aforementioned functionality.

The vehicle controller 112 and/or the controller 140 can also be operatively coupled to a data center 150 by way of a network 152 of the assembly 100. For instance, the controller 140 can be operably connected to the network 152 by way of the vehicle controller 112 or the controller 140 may be directly connected to the network 152, separately from the vehicle controller 112. The data center 150 may also be configured to receive, process, and record data concerning with the system 100. The data center 150 may be in the form of any desired remote or offsite data center which may receive, process, and/or store any data concerning the operation of the assembly 100, the crop material, the field itself, and/or various other conditions, such as the real-time weather conditions. The network 152 may be any suitable network, including a wireless network having one or more processors or nodes. Additionally, the network 152 may broadly represent any combination of one or more data communication networks including local area networks, wide area networks, neural networks, etc., using a wired or wireless connection.

It should be appreciated that the vehicle controller 112, the controller 140, and/or the data center 150 may solely or collectively generate the moisture content map 154 and/or conduct drying time 156 processing for processing the signals, e.g. location data, moisture content data, etc., from the sensors 116, 144, 146, 148 and estimating a drying time for one or more sections or zones of the field. The moisture content map 154 may be generated for the entire field or portions thereof such that the map may be created and updated in real-time as the mower-conditioner machine 120 is operating in the field. In more detail, the controller 140, vehicle controller 112, and/or the data center 150 may determine the moisture content of the crop material via a lookup table upon receiving the moisture data from the sensor(s) 148, overlay the determined moisture content with location data, and subsequently create the moisture content map 154. The moisture content map 154 and/or any other desired information, such as the crop type and/or weather conditions, may be used to estimate a drying time 156 of the crop material. The estimated drying time 156 may be sectionalized by specific passes and/or zones of similarly grouped crop material, such as dry or moist groupings of crop material. Furthermore, the controller(s) 140, 112, and/or data center 150 may generate an optimized procedure based on the estimated drying time. For instance, one or more specific areas of the field may require more or less dry-down time, which can then be used to more precisely plan an optimum baling or chopping strategy in a particular field to provide optimum dry-down time for each section of a field. For example, if the crop material mowed in the northwest quadrant of a field has much higher moisture content at the time of mowing than the other three quadrants, then the operator can bale or chop the northwest quadrant last, thus allowing it more dry-down time the other sections of the field rather than entering the field and beginning operation wherever it is most convenient to start operation. As can be appreciated, the data center may or may not store the moisture content map 154 and/or the estimated drying time 156.

The location sensor 144 may be connected to the frame 122. The location sensor 144 may be in the form of any desired sensor for sensing the location of the mower-conditioner machine 120. The crop characteristic sensor 146 can be connected to the frame 122 at any desired location. The crop characteristic sensor 146 may be in the form of any desired sensor for sensing one or more characteristics of the crop, such as an optical sensor, e.g. camera, or a wave-ranging sensor, e.g. LIDAR sensor. The crop characteristic sensor 146 may sense the type of crop material being harvested. It is noted that the mower-conditioner machine 120 may not include a location sensor 144 or a crop characteristic sensor 146.

Each moisture sensor 148 may be connected to a respective crop-engaging member. As shown in FIGS. 1-2, the moisture sensor(s) 148 is connected to the crop-engaging surface, i.e., underside, of the swathgate 134. Each moisture sensor 148 may be embedded within the swathgate 134 so that each sensor 148 is flush with the crop-engaging surface of the swathgate 134. Each moisture sensor 148 may be in the form of one or more electrodes for sensing a voltage drop between the electrodes or between one electrode and the ground, e.g. a component of the swathgate 134 and/or frame 122 which is grounded, and/or a wave-ranging sensor, e.g. a LIDAR sensor or infrared sensor. It should be appreciated that one or more moisture sensors 148 may also be connected to one or both of the side shields 136. For instance, a moisture sensor 148 may be connected to the inner, crop-engaging surface of one of the shields 136. However, only the swathgate 134 may have moisture sensors 148 connected thereto.

Additionally, the one or more moisture sensors 148 may be fitted within a mount 160, such as an electrically insulated mount 160, that connects the moisture sensor(s) 148 to the swathgate 134 (FIG. 2). In more detail, the swathgate 134 may have a through-hole or recessed portion in which the mount is seated. The mount 160 may comprise a plastic material.

In the embodiment wherein the one or more moisture sensors 148 comprise the electrode(s), a current may pass between the electrodes and/or ground and through the crop material as the stream of crop material passes over the electrode(s) in the swathgate 134. Hence, the voltage difference or drop which results from the current flow through the crop material will ultimately determine the moisture content of the crop material. Upon receiving the moisture data from the moisture sensor(s) 148, the controller 140, the vehicle controller 112, and/or data center 150 may determine the moisture content of the crop material by employing a lookup table or algorithm that correlates the moisture data to a particular moisture content of the crop material.

Figure 3:
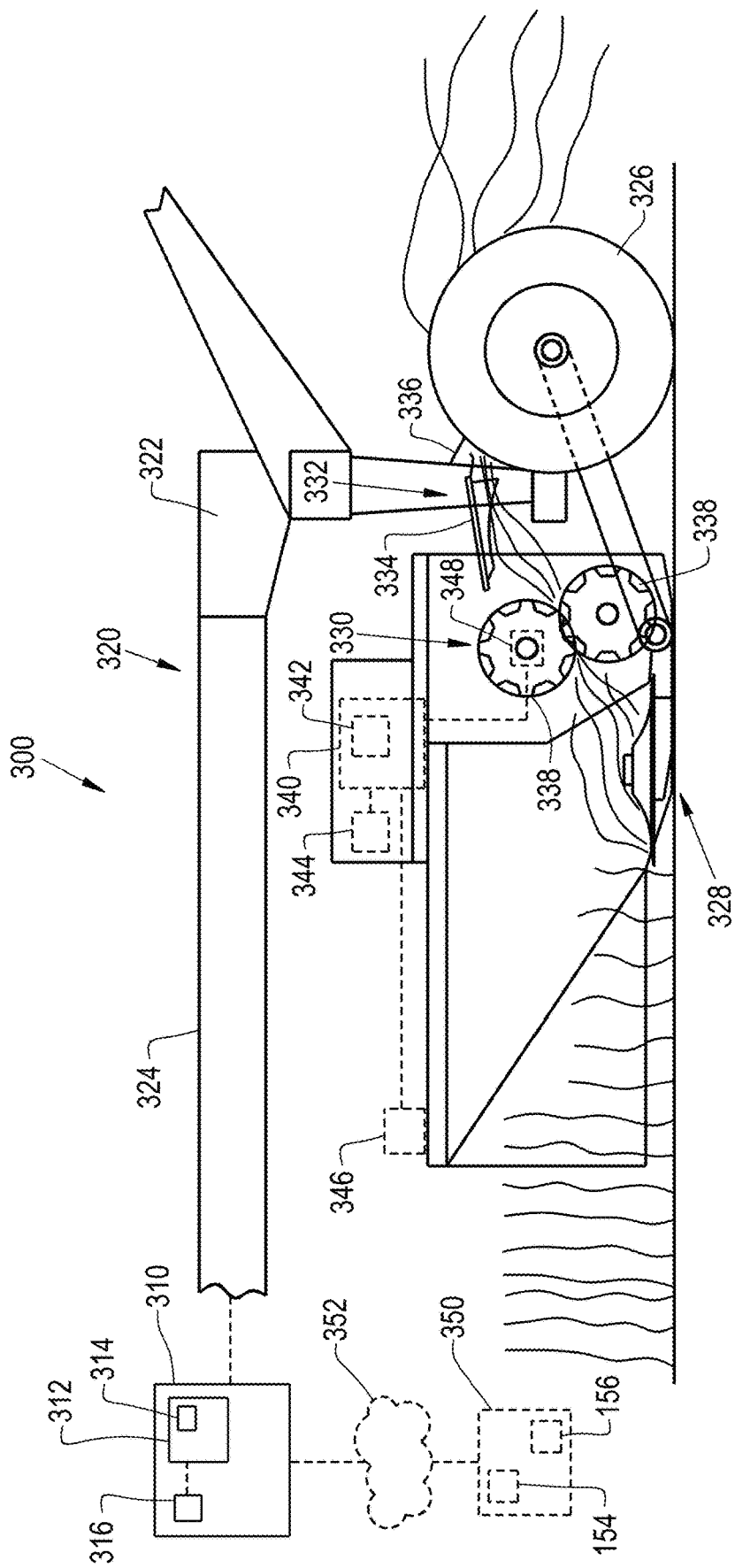
FIG. 3 illustrates a side view of another exemplary embodiment of an agricultural assembly, the assembly including a work vehicle and a pull-type mower-conditioner machine with one or more moisture sensors located at the crop conditioner, in accordance with the present disclosure.

Referring now to FIG. 3, there is shown another embodiment of an agricultural assembly 300, which may be substantially similar to the agricultural assembly 100 except that the moisture sensor(s) 348 is(are) located on one or both of the crop conditioning rolls 338 instead of or in addition to the swathgate 334. For instance, one moisture sensor 348 may be coupled to one conditioning roll 338. In one embodiment, a current may be provided to the conditioning roll 338 and the other conditioning roll 338 may be grounded such that a voltage drop measured between the conditioning rolls 338 may be used to determine the moisture content of the crop material. It should be appreciated that the swathgate 334 may not include any moisture sensors 348. It should also be appreciated that the mower-conditioner machine 320 may include two or more moistures sensors 348 located on swathgate 334 and the conditioning rolls 338. The controller 340 may function similarly to the controller 140, as discussed above, to generate the moisture content map 154. Like elements have been identified with like reference characters, except for the 300 series designation.

Figure 4:
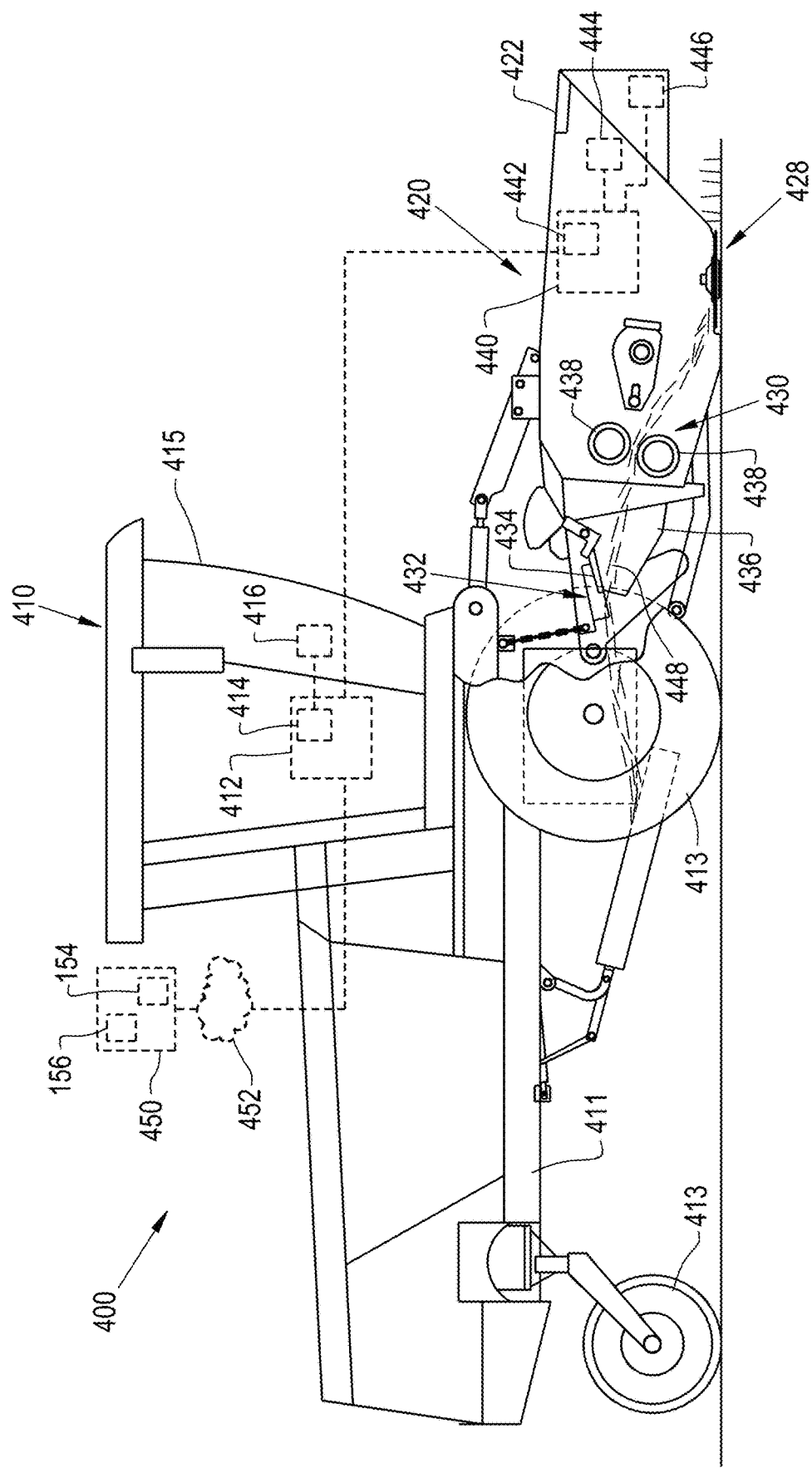
FIG. 4 illustrates a side view of another exemplary embodiment of an agricultural assembly, the assembly including a work vehicle and a mower-conditioner machine in the form of an attachment head, in accordance with the present disclosure.

Referring now to FIG. 4, there is shown another embodiment of an agricultural assembly 400 which includes a work vehicle 410 and a mower-conditioner machine 420. As shown, the work vehicle 410 is a self-propelled windrower 410 and the mower-conditioner machine 420 is an attachment head 420 that is removably connected to the windrower 410.

Similarly to the work vehicle 110, the work vehicle 410 may include a chassis 411, wheels and/or tracks 413, a prime mover, a steering assembly, a cab 415, a controller 412, with a memory 414, and one or more sensor(s) 416, such as a location sensor 416, for sensing various operating parameters of the work vehicle 410. The vehicle controller 412 may operate substantially similar to the vehicle controller 112, as discussed above.

The mower-conditioner machine 420 may be removably connected to and pushed by the work vehicle 410. The mower-conditioner 420 may include a frame 422 that is removably connected to the chassis 411 of the work vehicle 410, a transversely disposed cutter bar 428, a crop conditioner 430 with conditioning rolls 438, and a discharge assembly 432. The discharge assembly 432 includes a swathgate 434 which may be pivotally connected to the frame 422 and a pair of side shields 436 which may be pivotally connected to the frame 422.

The mower-conditioner machine 420 may also include a controller 440, with a memory 442, and one or more sensor(s) 446, 448 for sensing various operating parameters of the mower-conditioner machine 420 and/or characteristics of the crop material. The controller 440 can be operably connected to the vehicle controller 412. The mower-conditioner machine 420 may include one or more crop characteristic sensors 446 and/or moisture sensors 448. The controller 440 and sensors 444, 446, 448 may be substantially similar to the controller 140 and sensors 144, 146, 148, as discussed above. It should be appreciated that the mower-conditioner machine 420 may not include a controller 440 or location sensor 444; therein, the various sensors sensor(s) 446, 448 may be operably coupled to the vehicle controller 412 which may control the functionality of the mower-conditioner machine 420. The agricultural assembly 400 may also include a data center 450 and a network 452 which may be similar to the data center 150 and network 152, as discussed above.

Figure 5:
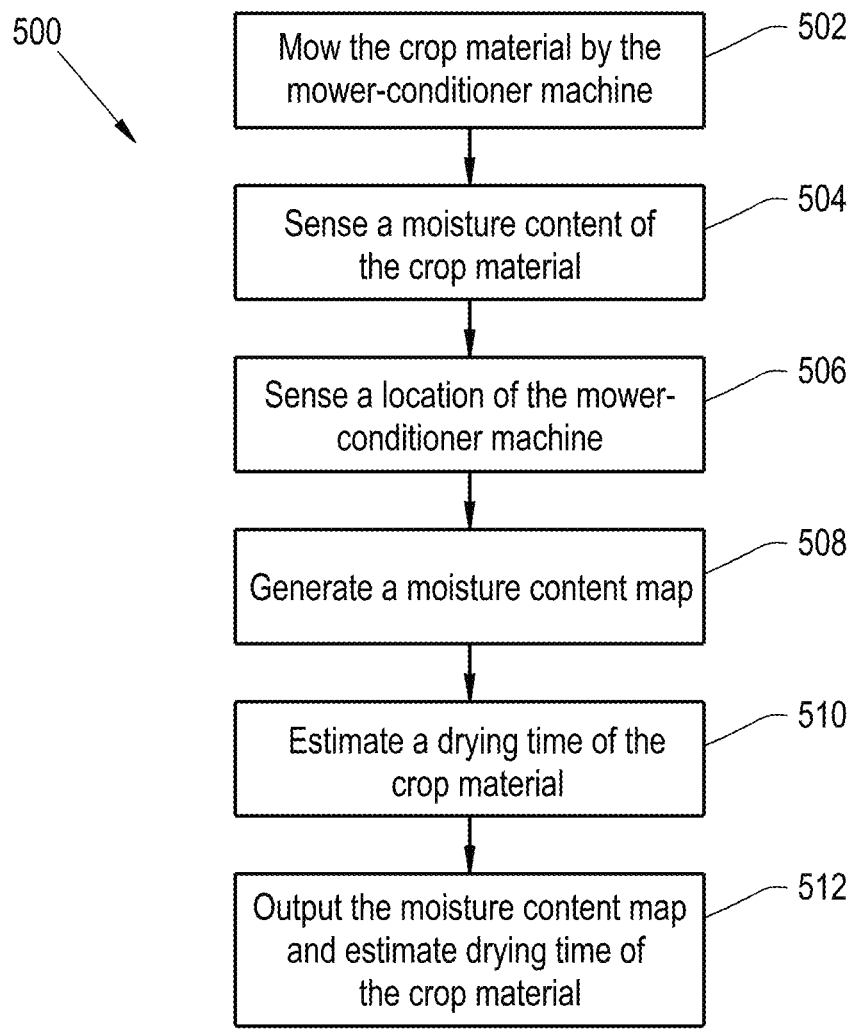
FIG. 5 illustrates a flowchart of a method for conducting an agricultural procedure in a field.

Referring now to FIG. 5, there is shown a flowchart of a method 500 for conducting an agricultural procedure. By way of example only, the method 500 is described herein with reference to the agricultural assembly 100. However, the agricultural assembly 100, 300, and/or 400 may be used to carry out the method 500. The method 500 may include mowing a crop material in the field by a mower-conditioner machine 120 (at block 502). At least one moisture sensor 148 may sense a moisture content of the crop material (at block 504). A location sensor 116 and/or 144 may sense a location of the mower-conditioner machine (at block 506). The vehicle controller 112, the controller 140, and/or the data center 150 may individually or collectively receive the moisture and location data and subsequently generate the moisture content map 154 based at least partially on the moisture content of the crop material and the location of the mower-conditioner machine (at block 508). Furthermore, the vehicle controller 112, the controller 140, and/or the data center 150 may individually or collectively estimate a drying time of the crop material based at least partially on the moisture content map (at block 510). Thereafter, the vehicle controller 112, the controller 140, and/or the data center 150 may output the moisture content map 154 and/or the estimated drying time 156 to the operator (at block 512)

It is to be understood that one or more of the steps of the method 500 may be individually or collectively performed by the vehicle controller 112, 312, 412, the controller 140, 340, 440, and/or the data center 150, 350, 450 of the agricultural assembly 100, 300, 400 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller(s) described herein, such as the method 500, is implemented in software code or instructions which are tangibly stored on a tangible computer readable medium. The controller(s) loads the software code or instructions via a direct interface with the computer readable medium or via a wired and/or wireless network. Upon loading and executing such software code or instructions by the controller(s), the controller(s) may perform any of the functionality of the controller(s) described herein, including any steps of the method 500 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A mower-conditioner machine, comprising:
a frame;
a cutter bar connected to the frame, the cutter bar being configured to cut a crop material from a field;
a crop-engaging member comprising a swathgate that is pivotally connected to the frame, the crop-engaging member being configured to contact the crop material; and
at least one moisture sensor adjacent an underside of the swathgate, the at least one moisture sensor being configured to sense a moisture content of the crop material.

2. The mower-conditioner machine of claim 1, further comprising a controller operably connected to the at least one moisture sensor.

3. The mower-conditioner machine of claim 2, wherein the controller is configured to receive location data regarding a location of the mower-conditioner machine in the field, wherein the controller is configured to generate a moisture content map based at least partially on the moisture content of the crop material and the location data.

4. The mower-conditioner machine of claim 3, wherein the controller is configured to estimate a drying time of the crop material based at least partially on the moisture content map sectionalized by at least one of specific passes or zones of similarly grouped crop material.

5. The mower-conditioner machine of claim 1, wherein the at least one moisture sensor is integrated into the swathgate.

6. The mower-conditioner machine of claim 1, wherein the at least one moisture sensor is flush with the underside of the swathgate.

7. The mower-conditioner machine of claim 1, further comprising a conditioning roll which is connected to the frame and configured to condition the crop material and at least one other moisture sensor coupled to the conditioning roll.

8. The mower-conditioner machine of claim 1, wherein the at least one moisture sensor comprises one of a single electrode configured to sense a voltage drop between itself and a ground, a pair of electrodes configured to sense a voltage drop between themselves, and a wave-ranging sensor.

9. The mower-conditioner machine of claim 1, further comprising a mount connecting the at least one moisture sensor to the crop-engaging member.

10. The mower-conditioner machine of claim 9, wherein the mount is electrically insulated.

11. An agricultural assembly, comprising:
a work vehicle; and
a mower-conditioner machine, comprising:
a frame connected to work vehicle;
a cutter bar connected to the frame, the cutter bar being configured to cut a crop material from a field;
a crop-engaging member comprising a swathgate that is pivotally connected to the frame, the crop-engaging member being configured to contact the crop material; and at least one moisture sensor adjacent an underside of the swathgate, the at least one moisture sensor being configured to sense a moisture content of the crop material.

12. The agricultural assembly of claim 11, further comprising a controller operably connected to the at least one moisture sensor.

13. The agricultural assembly of claim 12, further comprising a location sensor configured to sense and provide location data regarding a location of the mower-conditioner machine in the field, wherein the controller is configured to receive the location data and generate a moisture content map based at least partially on the moisture content of the crop material and the location data.

14. The agricultural assembly of claim 13, wherein the controller is configured to estimate a drying time of the crop material based at least partially on the moisture content map sectionalized by at least one of specific passes or zones of similarly grouped crop material.

15. The agricultural assembly of claim 11, wherein the at least one moisture sensor is integrated into the swathgate.

16. The agricultural assembly of claim 11, wherein the at least one moisture sensor is flush with the underside of the swathgate.

17. The agricultural assembly of claim 11, further comprising a conditioning roll which is connected to the frame and configured to condition the crop material and at least one other moisture sensor coupled to the conditioning roll.

18. The agricultural assembly of claim 11, wherein the mower-conditioner machine further comprises a mount connecting the at least one moisture sensor to the crop-engaging member.

19. The agricultural assembly of claim 17, wherein the mount is electrically insulated.

20. A method for conducting an agricultural procedure, comprising:
- mowing a crop material in a field by a mower-conditioner machine having a frame and a crop-engaging member comprising a swathgate that is pivotally connected to the frame;
- sensing, by at least one moisture sensor adjacent an underside of the swathgate, a moisture content of the crop material;
- sensing, by a location sensor, a location of the mower-conditioner machine;
- generating, by a controller, a moisture content map based at least partially on the moisture content of the crop material and the location of the mower-conditioner machine; and
- estimating, by the controller, a drying time of the crop material based at least partially on the moisture content map.

* * * * *